July 2, 1963
B. STILLER ETAL
3,095,650
MULTIFILAR MEASURING DEVICE
Filed May 13, 1959
2 Sheets-Sheet 1
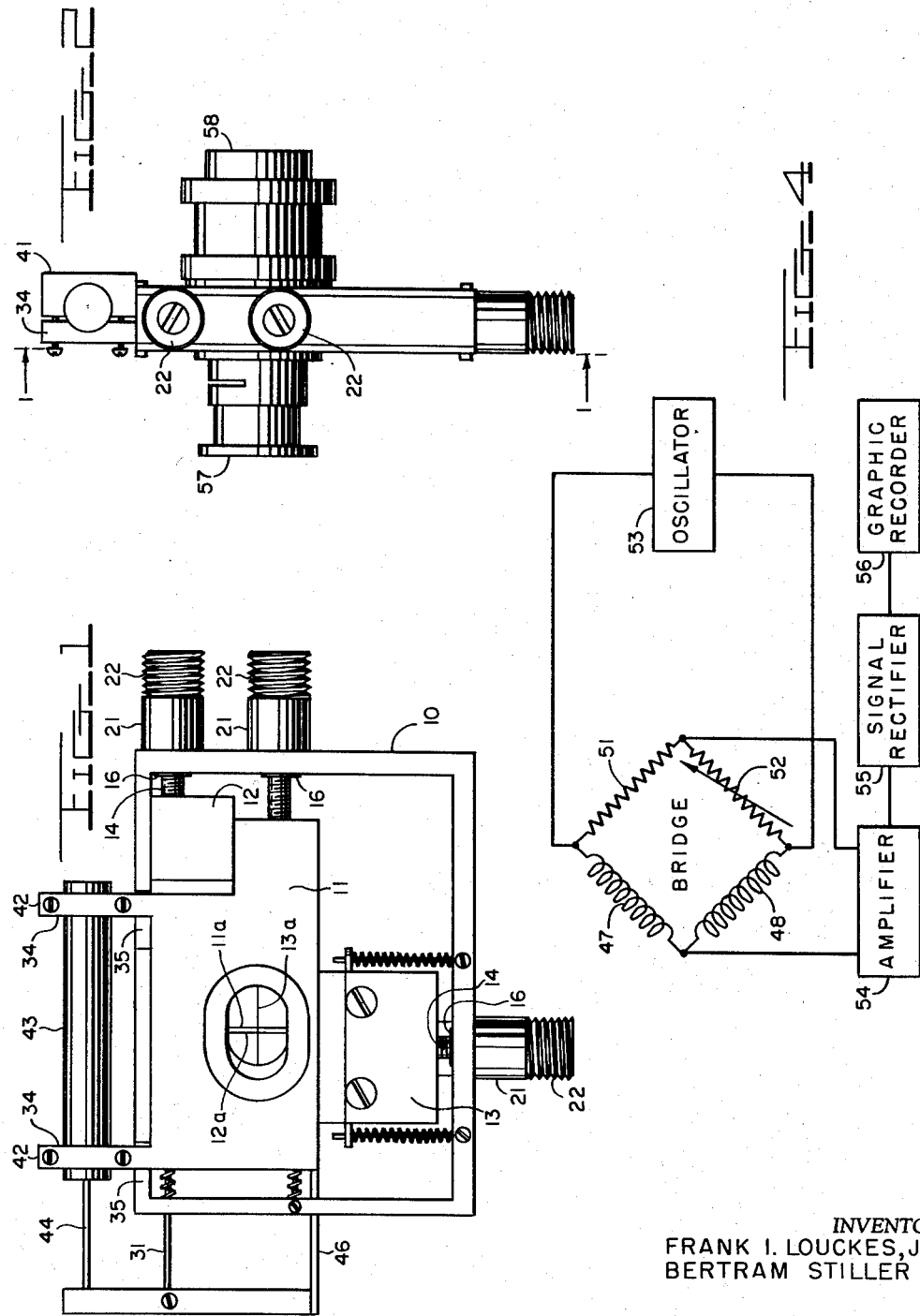
INVENTORS
FRANK I. LOUCKES, JR.
BERTRAM STILLER
BY *Richard C. Reed*
ATTORNEY July 2, 1963  B. STILLER ETAL  3,095,650
MULTIFILAR MEASURING DEVICE
Filed May 13, 1959  2 Sheets-Sheet 2

INVENTORS
FRANK I. LOUCKES, JR.
BERTRAM STILLER

BY  *Richard C. Reed*

ATTORNEY

United States Patent Office 3,095,650
Patented July 2, 1963

3,095,650
MULTIFILAR MEASURING DEVICE
Bertram Stiller, Washington, D.C., and Frank I. Louckes, Jr., Arlington, Va., assignors to the United States of America as represented by the Secretary of the Navy
Filed May 13, 1959, Ser. No. 813,043
2 Claims. (Cl. 33—46)
(Granted under Title 35, U.S. Code (1952), sec. 266)

The invention described herein may be manufactured and used by or for the Government of the United States of America for governmental purposes without the payment of any royalties thereon or therefor.

The present invention relates to microscope accessories and more particularly to a device for measuring and recording the diameter or width of an object in a microscopic field.

Heretofore devices have been used for locating an object within a field being observed and indicating the position of the object with respect to the field. Other devices have been used for measuring particle sizes such as image projection devices in which the image size is measured on a screen, various forms of graticules, the ocular micrometer and other optical elements such as rotating prisms associated with a microscope. These prior art devices have their drawbacks and require considerable effort to obtain good results in obtaining particle sizes.

The measuring device of the present invention is associated with the eyepiece of a microscope and includes movable parallel fiducial lines, points, etc., which can be adjusted such that one fiducial reference is located at one edge of the particle and another reference is set at the opposite edge. The spacing between the references is recorded to indicate the width or diameter of the particle. Since the reference points, or lines are observed through the eyepiece, the references can be adjusted at any time to account for drift or defocusing of the image.

It is therefore an object of the present invention to provide a particle size measuring device which can be easily observed and operated while viewing a particle field.

Another object is to provide a particle size measuring device which is accurate, simple in construction and readily adjustable for any particle image change.

Still another object is to provide an improved device for measuring particle sizes in width or diameter.

Yet another object is to provide a device which is easily adaptable with a microscope for viewing particle sizes in an observed field.

These and other objects will be more apparent and the invention will be more readily understood from a consideration of the specification when taken in conjunction with the drawings of a preferred device in which:

FIG. 1 is a view from the top without the top cover plate which illustrates the relative parts;

FIG. 2 is a side view;

FIG. 4 is a block diagram illustrating an electrical bridge circuit and the related elements.

Figure 3:
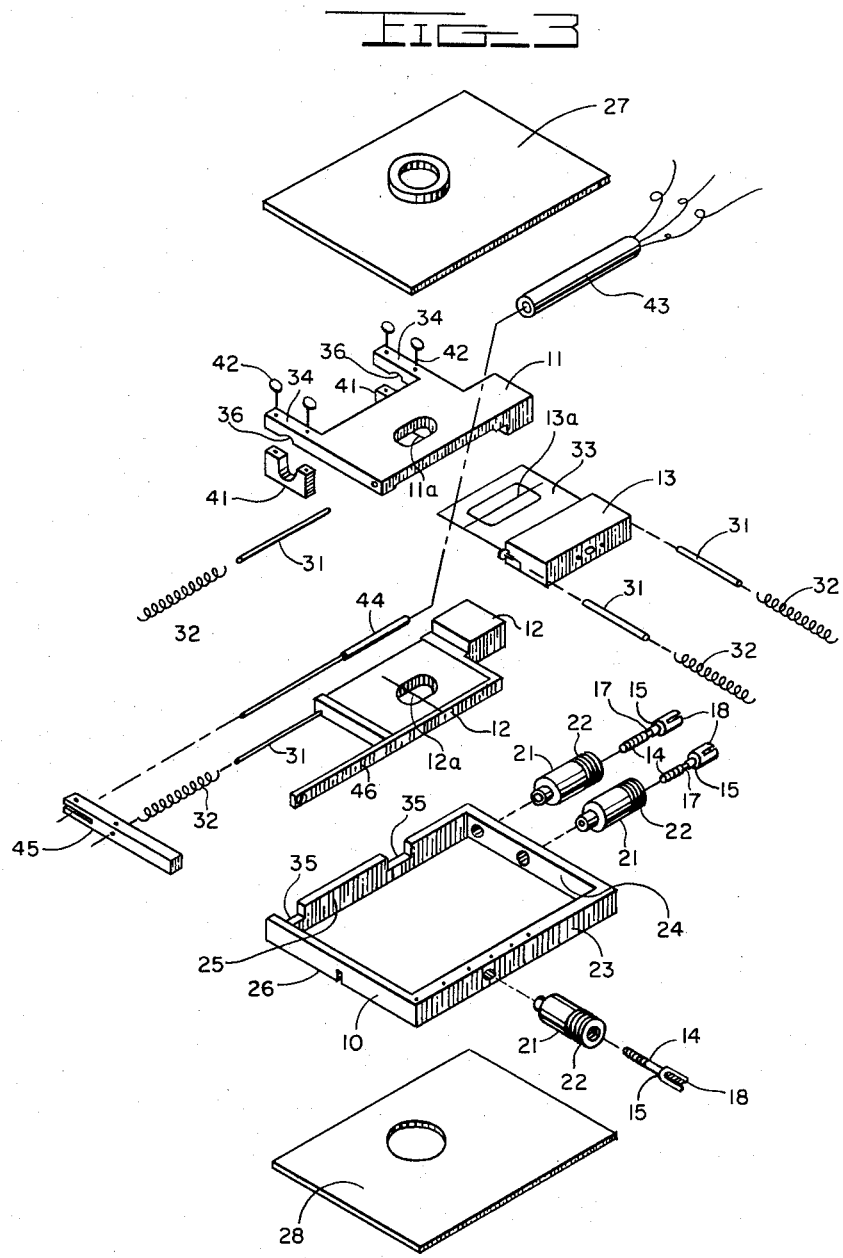
FIG. 3 is an exploded view illustrating the parts and their relative positions.

The device of the present invention is adapted to provide accurate recording of particle sizes in width or diameter in a field observed by a microscope. The device is adapted to be positioned adjacent to the eyepiece of a microscope in the field of view such that fiducial references on the measuring device can be observed through the eyepiece as well as the particles in the field. The device of a preferred modification as shown includes two independently movable parallel cross hairs or lines and a third movable cross hair or line which is positioned perpendicular to the parallel lines and adapted to be moved across the field of view perpendicular to the parallel lines. The parallel lines have a transducer consisting of a coil and movable iron core connected therewith such that the iron core is movable into and out of the coil as the parallel lines are moved in spaced relationship relative to each other in accordance to the width or diameter of a particle being measured. The transducer produces a voltage in accordance to the distance the core is withdrawn from the coil which is proportional to the distance between the hair lines and the voltage produced is amplified, rectified and fed into a recording machine which indicates the distance between the cross hairs in accordance to the electrical pulse received.

Referring now to the drawings wherein like reference characters throughout refer to like parts, there is shown by illustration in the several views a particle width or diameter measuring device made in accordance with the present invention. As shown, the device includes a housing 10 within which two carriages 11 and 12 are adapted to move along a line relative to each other. Each of the carriages have an aperture therein across which hairlines or cross hairs 11a and 12a have been secured in parallel relationship for movement with their carriages in directions along a line such that the hairs will remain parallel to each other. A third carriage 13 is adapted to be moved in directions perpendicular to the line of movement of carriages 11 and 12 and has an aperture therein across which a hairline or crosshair 13a has been secured. The crosshair 13a moves with carriage 13 along a line perpendicular to the parallel lines 11a and 12a. The parallel lines are adapted to be moved relative to each other such that the hairlines can be set along opposite edges of the viewed particle to be measured and thus indicate the width or diameter of the particle. Carriage 13 is adapted to be moved perpendicular to the direction of movement of carriages 11 and 12 such that the hairline is lined across the particle being measured to provide a reference line.

Each of the carriages are adapted to be moved across the field of view by any suitable drive means such as by threaded screws 14, which are held in place for rotation by a shoulder 15 on one side of the housing and a split lock washer 16 on the opposite side which slides into a groove 17 in each of the threaded screws. The outer end of each screw has a split head 18, or any other suitable shape, for reception of an individual hand drive or a flexible cable which is connected thereto and has a hand operated knob attached thereto for rotation of each screw independently. Each of the screws fit into a connector 21 which is press fitted into an aperture in the housing and has threads 22 on the outer end to which the drive means for the screw threads is connected.

The housing is provided with four walls 23, 24, 25 and 26, a top plate 27 and a bottom plate 28. The carriages are arranged within the housing and adapted to be moved relative to each other and are provided with suitable guides in the form of round rods 31 which holds the carriages in place during movement and which have small springs 32 about the rods to apply slight pressure on the carriages during movement to prevent any lost motion. Carriage 11 is mounted above carriage 12 and has the hairline 11a on the bottom surface thereof whereas carriage 12 has the hairline 12a on the upper surface thereof such that the hairlines will be closely related to each other. Carriage 13 has a very thin extension 33 to which the hairline is mounted and is adapted to be inserted between carriages 11 and 12 such that the hairline will be closely related to the parallel hairlines on carriages 11 and 12. Each of the hairlines are adapted to be moved about one quarter of an inch being limited by the carriage movement within the housing.

Carriage 11 has two arms 34 extended through slots 35 in side 25 of the housing. The arms have semicylindrical portions cut out at 36 near the outer end thereof and have matching clamps 41 adapted to be secured thereto by screws 42. The clamps 41 secure the coil 43 of a transducer to the arms and an iron core 44, which is adapted to be adjustable with respect to the coil, is held at an outer end by an arm 45 connected on the outside of the housing to carriage 12 by an arm 46 and the guide rod 31. As the carriages 11 and 12 are moved with respect to each other, the core 44 is also moved relative to coil 43 and, the displacement produces a voltage in accordance to the distance of the movement.

The windings of coil 43 of the transducer form two arms 47 and 48 of an electrical bridge circuit which also includes a fixed resistor 51 and a variable resistor 52. The bridge is excited by any suitable means such as a three kilocycle oscillator 53 and the signal produced by the transducer portion of the bridge is directed into an amplifier 54 where the signal is amplified and directed into a signal rectifier 55 and then into a recorder 56 of any well known type such as a recorder manufactured by Varian Associates, Inc. The recorder positions the pen to the recording chart to record the width of the particle in accordance to the movement of the carriages 11 and 12 which produces the signal recorded. The recorder arm is adapted to be moved by hand or any other means toward the chart in order to mark the various measurements when desired.

The upper cover plate of the housing is adapted to secure the eyepiece 57 of a microscope thereto and the bottom cover plate has a sleeve arrangement 58 connected thereto which slips over the tube of the microscope for securing the measuring device to the microscope. In use, the measuring device replaces the microscope eyepiece. A suitable microscope being a Leitz Ortholux type manufactured by E. Leitz & Company.

In operation, the measuring device is secured to the tube of a microscope and the transducer is connected into the electrical circuit. The hairlines of carriages 11 and 12 are aligned with each other over the particle to be measured and the variable resistor is adjusted for a zero reading on the recorder. The centering carriage 13 is moved until the hairline 13a is positioned over the particle of interest and then the hairlines of carriages 11 and 12 are moved apart until the hairlines are positioned along the edges of the particle to be measured. Movement of the carriages moves the iron core 44 with respect to the coil of the transducer which produces a signal by changing the values of the bridge circuit. The signal is amplified, rectified and then fed into the recorder where the measurement is recorded in accordance to the signal received at the recorder.

The chart paper used is divided such that each line equals 0.01 micron therefore, it is seen that very narrow widths can be measured. For measuring the variation in the width of an elongated particle or cell, the cross hairline of carriage 13 is moved along the length of the cell to act as a centering guide and the parallel hairlines of carriages 11 and 12 are moved to the edges of each of the portions or particles being measured.

The device of the present invention does not require any additions or subtractions and provides a simple device which can accurately determine the width of a particle, cell, grain, etc., found in observing matter through a microscope.

In carrying out the teaching of the present invention it is not necessary to provide the carriage 13 and crosshair 13a. In making use of such a device the carriages 11 and 12 are secured in a housing such that they will move along a line with the fiducial references parallel to each other and the housing is adapted to move the carriages across the particle being measured. In this manner the fiducial references will be moved to a particular portion on the particle being measured and then the carriages adjusted for the width measurement of the particle.

Obviously many modifications and variations of the present invention are possible in the light of the above teachings. It is therefore to be understood that within the scope of the appended claims the invention may be practiced otherwise than as specifically described.

What is claimed is:

1. A device adapted to be secured to the tube of a microscope to measure the width of particles in a microscopic field which comprises a housing, including a cover plate and a bottom plate, said cover plate having an aperture centrally disposed therein, an eyepiece secured in said aperture, said bottom plate having an aperture therein in alignment with said aperture in said cover plate, a sleeve element secured to said aperture in said bottom plate and adapted to fit over the tube of a microscope, three carriages movably mounted in said housing, each of said carriages having an aperture therein in alignment with said apertures in said top and bottom plates, crosshairs mounted on each of said carriages across the center of their respective apertures in said carriages, two of said crosshairs being arranged in parallel relationship and adapted independently to move across the field of view along a line in parallel relationship with movement of their respective carriages, the other of said crosshairs adapted to be moved across the field of view perpendicular to said parallel crosshairs by movement of its respective carriage, a transducer adapted to be connected to said carriages having said parallel crosshairs thereon, said transducer adapted to produce a voltage signal proportional to the movement of said parallel crosshairs as said crosshairs are positioned along opposite sides of said particle to be measured, and recorder means adapted to receive said signal and to record the distance of movement of said crosshairs, said record being a measure of the width of said particle measured.

2. A device adapted to be secured to the tube of a microscope to measure the width of particles in a microscopic field which comprises first and second relatively movable carriages, each of said first and second carriages having a hairline secured thereto in the field of view in parallel relationship, said first and second carriages adapted to move their respective hairline independently in directions parallel to each other, a third carriage having a crosshair thereon in the field of view and adapted to be moved perpendicular to said crosshairs on each of said first and second carriages to provide a reference line, a transducer, said transducer comprising a coil portion connected to said second carriage and an iron core positioned within said coil with one end thereof connected to said first carriage, said core adapted to be moved with respect to said coil simultaneous with any movement of either of said first and second carriages, said coil portion comprising two arms of an electrical bridge circuit whereby said movement of said core produces a voltage output signal across said electrical bridge circuit proportional to said movement, and recorder means adapted to receive said signal and record the distance of movement of said coil, said record being a measure of the width of said particle.

References Cited in the file of this patent

UNITED STATES PATENTS

| | | |
|---|---|---|
| 886,722 | Neumeyer | May 5, 1908 |
| 1,918,556 | Pfau | July 18, 1933 |
| 2,050,629 | Quereau et al. | Aug. 11, 1936 |
| 2,412,017 | Taylor et al. | Dec. 3, 1946 |
| 2,627,119 | Graham | Feb. 3, 1953 |
| 2,814,883 | Strimel | Dec. 3, 1957 |
| 2,837,968 | Akashi | June 10, 1958 |